United States Patent [19]

Vickers

[11] Patent Number: 4,478,793
[45] Date of Patent: Oct. 23, 1984

[54] RADIAL FLOW REACTOR WITH OPERATING TEMPERATURE PROFILE

[75] Inventor: Anthony G. Vickers, Arlington Heights, Ill.

[73] Assignee: UOP Inc., Des Plaines, Ill.

[21] Appl. No.: 421,629

[22] Filed: Sep. 22, 1982

[51] Int. Cl.³ ............................ F28D 21/00; B01J 8/08
[52] U.S. Cl. .................................... 422/216; 208/167; 208/171; 422/198; 422/218; 422/220
[58] Field of Search ............... 422/109, 208, 216, 218, 422/220, 224, 203, 205, 206, 207, 191, 192, 194, 198; 208/137, 139, 166, 167, 171

[56] References Cited

U.S. PATENT DOCUMENTS

| | | | |
|---|---|---|---|
| 1,682,787 | 9/1928 | Jaeger | 422/192 |
| 2,234,169 | 3/1941 | Houdry et al. | 422/220 |
| 3,652,231 | 3/1972 | Greenwood et al. | 23/288 G |
| 3,706,536 | 12/1972 | Greenwood et al. | 23/288 G |
| 3,785,963 | 1/1974 | Boyd et al. | 208/171 |
| 3,882,015 | 5/1975 | Carson | 208/169 |
| 3,978,150 | 8/1976 | McWilliams, Jr. | 260/683.3 |
| 4,110,081 | 8/1978 | Millar et al. | 23/288 G |

Primary Examiner—Barry Richman
Assistant Examiner—William R. Johnson
Attorney, Agent, or Firm—James R. Hoatson, Jr.; John F. Spears, Jr.; William H. Page, II

[57] ABSTRACT

A radial flow reactor design which allows the maintenance of a temperature profile along the height of a catalyst bed which descends through the reactor by gravity flow. Two feed inlet conduits are provided on the inlet side of the annular catalyst bed, with the inlets being divided by a porous flow control and distribution means. The inlet streams have different temperatures and the distribution means produces a changing admixture rate between the two streams along the bed. A preferred form of the distribution means is an open-topped cone located within the centerpipe of the reactor.

13 Claims, 2 Drawing Figures

RADIAL FLOW REACTOR WITH OPERATING TEMPERATURE PROFILE

FIELD OF THE INVENTION

The invention relates to a fluid-solids contacting apparatus primarily intended for use as a reactor in performing a chemical reaction. The invention more specifically relates to radial flow reactors used in hydrocarbon conversion processes such as petroleum refining processes or processes for producing petrochemicals. The invention also relates to moving bed reactors in which catalyst slowly moves downward in a nonfluidized bed by gravity flow due to the removal of catalyst at the lower portion of the reactor and the addition of catalyst to the upper portion of the reactor.

PRIOR ART

The use of radial flow reactors and of moving bed reactors to perform a variety of chemical reactions is well known to those skilled in the art of designing reactors for pertroleum refining and petrochemical operations. A rather detailed description of such radial flow reactors which are designed for the catalytic reforming of naphthas is provided in U.S. Pat. Nos. 3,706,536; 3,785,963; 3,978,150 and 4,110,081. These references are also pertinent for their overall teaching of catalyst transport methods and reactor construction and operation techniques.

U.S. Pat. No. 3,652,231 illustrates a moving bed radial flow reactor utilized as a catalyst regenerator. This patent is pertinent for its overall teaching and also for its showing of a device located in the centerpipe of a reactor which removes two substantially different vapor streams from the centerpipe.

U.S. Pat. No. 3,882,015 illustrates a moving bed reactor system having three separate contacting stages or zones. Two of these radial flow zones have a conduit communicating with the cylindrical centerpipe volume for the purpose of delivering a heat exchange fluid to the centerpipe volume. This fluid is in addition to the existing reactant flow which also enters the centerpipe volume. The heat exchange fluid may serve to either heat or cool the reactants depending on whether an endothermnic or an exothermic reaction is being performed in the reaction system.

BRIEF SUMMARY OF THE INVENTION

The invention provides a unique moving bed radial flow reactor which allows a temperature gradient to be maintained along the height of the catalyst bed. This is advantageous when it is desired to operate different sections of the catalyst bed at different temperatures in order to optimize the performance of the catalyst. For instance the subject reactor allows the portion of the reactants which contacts used, and less active, catalyst to be at a higher temperature than the portion of the reactants passing through the upper portion of the same catalyst bed, which contains more highly active catalyst.

One broad embodiment of the invention may be characterized as a moving bed radial flow reactor which comprises an enclosed outer vessel having a vertical orientation and comprising a cylindrical outer wall; an annular form catalyst bed confined within a catalyst retaining system comprising an inner catalyst retention screen and an outer catalyst retention means; a first fluid outlet means communicating with a first fluid transfer volume located between the outer catalyst retention means and the inner surface of the outer wall of the vessel; means to maintain a temperature profile along the height of the catalyst bed comprising a perforated wall which substantially divides a cylindrical second fluid transfer volume located within the inner catalyst retention screen into a first fluid receiving volume and a second fluid receiving volume; a first fluid inlet conduit communicating with the first fluid receiving volume, and a second fluid inlet conduit communicating with the second fluid receiving volume; and means to slowly transfer the catalyst bed downward by gravity flow through the catalyst retaining system.

The drawings are presented for illustrating the inventive concept and for providing a clear understanding of different embodiments of the invention. The drawings are not intended as working drawings and have therefore been simplified by the deletion of various minor structures such as welds and structural supports which are normally present, and such well known and widely used accouterments as manways, temperature monitoring systems and details of the catalyst transfer systems. This presentation of two embodiments of the subject invention is not intended to preclude from the scope of the subject invention those other embodiments set out herein or which are the result of the normal and expected modification of those embodiments.

Figure 1:
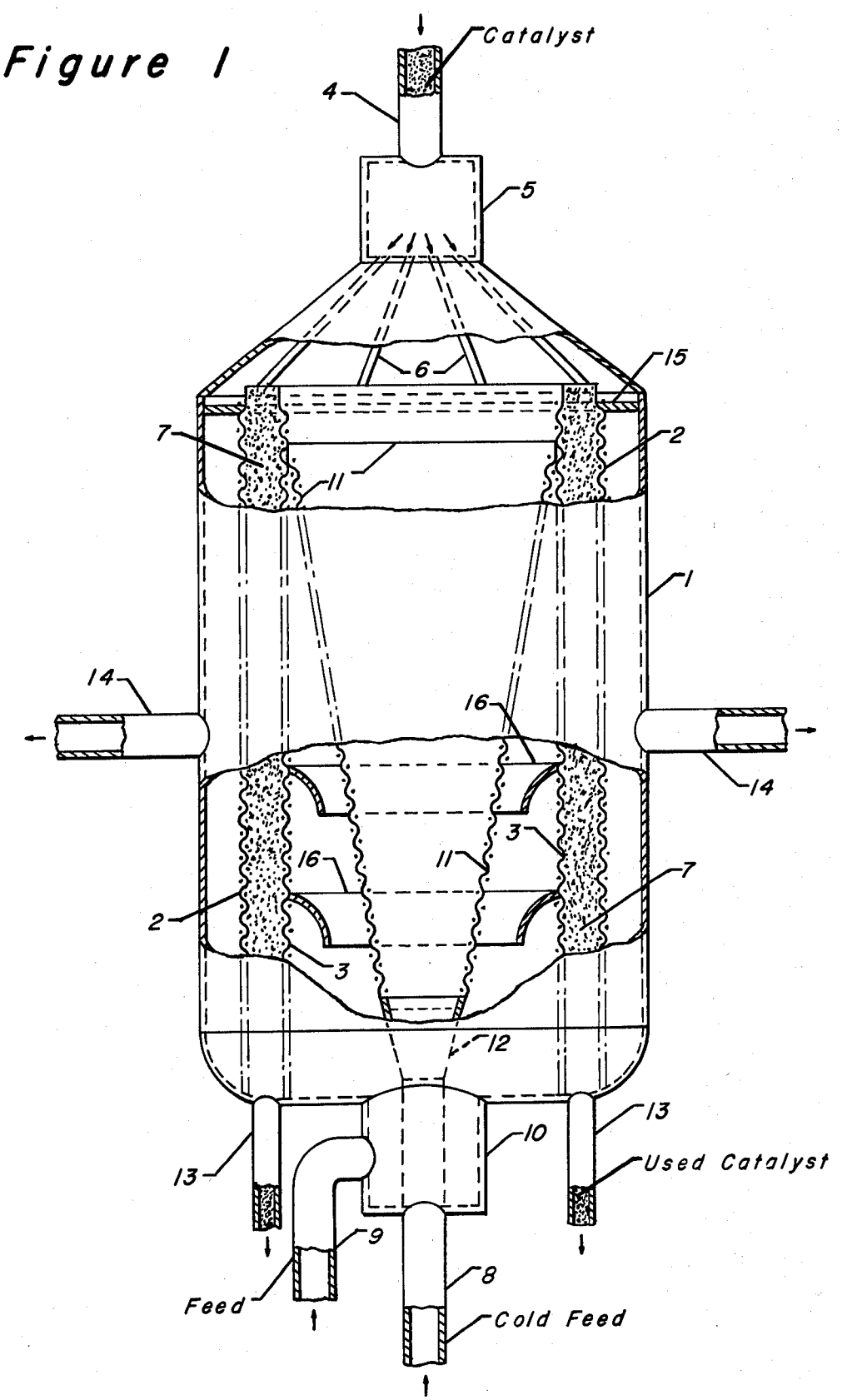
FIG. 1 illustrates the preferred embodiment of the invention, wherein a portion of a first feed stream entering through line 9 is admixed with a portion of "cold" second feed stream entering through line 8 at a controlled and varying rate as the second feed stream passes outward through the flow control screen 11. The total feed material flows outward through the annular catalyst bed 7 and is removed through the outlet conduits 14.

Referring now to FIG. 1, the subject invention is illustrated as a radial flow reactor comprising an outer vessel 1 and which has been adapted to use as a moving bed reactor. In this moving bed reactor, catalyst is periodically withdrawn in small quantities though the catalyst removal conduits 13 which communicate through the outer vessel with the bottom of an annular bed of catalyst 7. Fresh or regenerated catalyst is fed to the reactor through the catalyst delivery conduit 4 and collected in the catalyst distribution chamber 5 before falling through the plurality of catalyst distribution ducts 6 to the top of the catalyst bed. The catalyst bed is defined by the outer cylindrical catalyst retention screen 2 and the inner catalyst retention screen 3 which are cylindrical in shape and concentric about the central axis of the reactor.

A first stream of the reactants which are to be passed through the catalyst enters the bottom of the reactor through conduit 8 and is fed into the cone-shaped volume which is defined on the sides by a perforate screen 11. Screen 11 divides the cylindrical fluid transfer volume located within the inner catalyst retention screen 3 into the upper fluid receiving volume into which the relatively low temperature feed stream of conduit 8 enters and a second lower fluid receiving volume which receives the relatively high temperature feed stream entering the reactor through conduit 9 via the annular flow distributor sleeve 10. The open area of screen 11 is arranged so to distribute the passage of the colder feed stream through screen 11 such that it mixes with hotter feed stream in predetermined proportions that will provide the required temperature profile. The two feed streams then pass outward through the annular bed of catalyst 7 into a second fluid transfer volume comprising the annular space between the outer catalyst retention screen 2 and the inner surface of the cylindrical outer wall of the vessel. The reactants are then withdrawn from the apparatus through two or more outlet conduits 14 and passed to the appropriate product recovery facilities. It is preferred that some form of relatively imperforate structure such as the circular baffles 16 are placed at intermediate points in the second fluid receiving volume to limit the backmixing of quantities of previously combined feed which have different temperatures and to thereby aid in establishing the temperature profile along the height of the catalyst bed.

The apparatus includes means to transfer catalyst or other particles through the annular bed by gravity flow. The catalyst from the inlet conduit 4 passes through the distributor 5 and the smaller conduit 6 before reaching the top of the annular catalyst bed. In the embodiment shown in FIG. 1, the conduits are located in an upper portion of the reactor which is in communication with the upper fluid receiving volume. A disc-shaped sealing plate 15 at the top of the catalyst bed prevents the flow of reactants from bypassing the catalyst bed. The catalyst fed to the top of the catalyst bed slowly moves down through the reactor as small quantities of catalyst are periodically removed from the bottom of the reactor through the plurality of conduit means 13 evenly disposed around the bottom of the catalyst bed.

Figure 2:
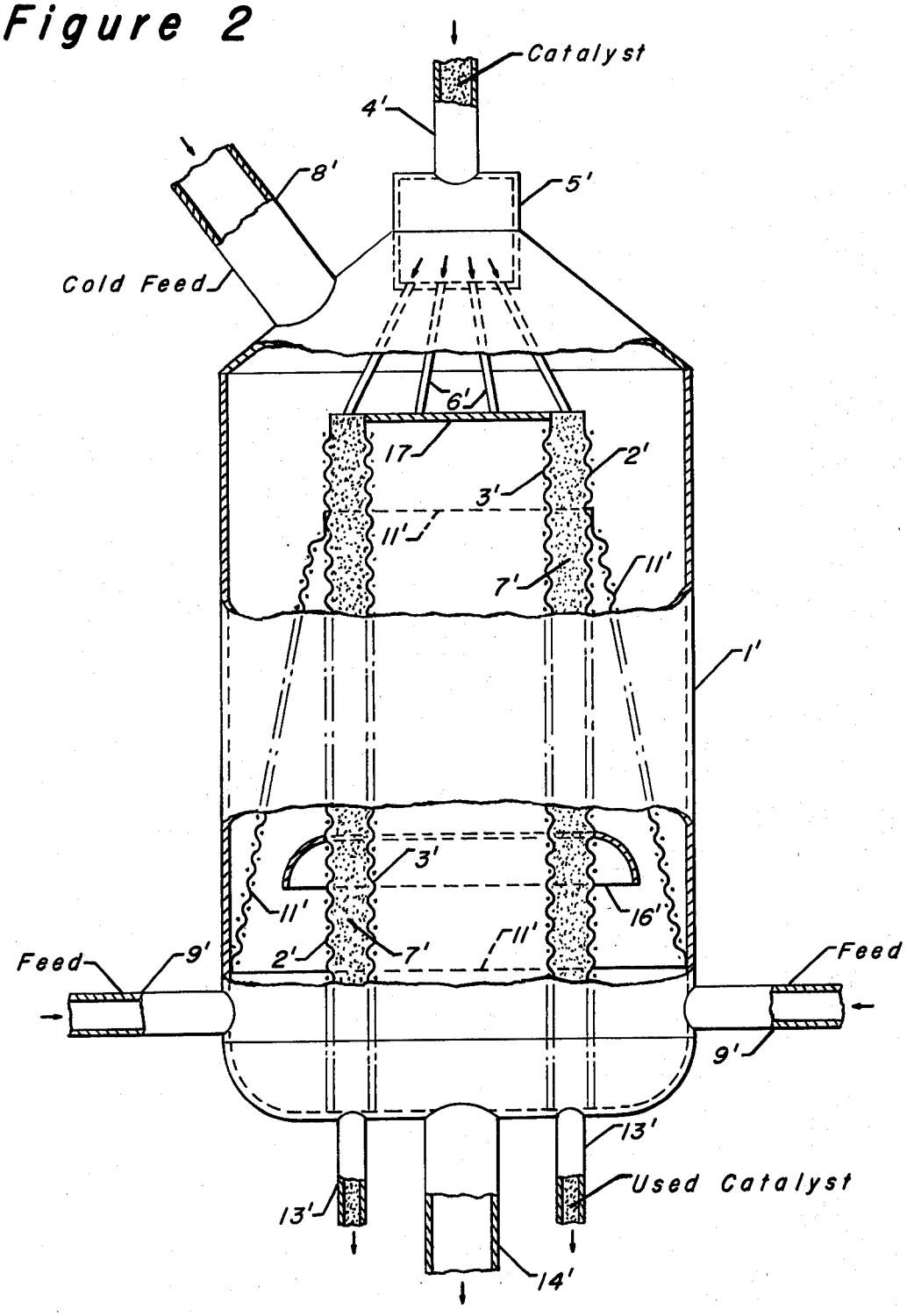
FIG. 2 illustrates an alternative embodiment of the invention which differs from the embodiment of FIG. 1 by the placement of the reactant flow control screen 11' in the annular space outside of the catalyst bed and by the passage of the two feed streams into this annular space through lines 8' and 9'. The feed streams therefore pass inward though the catalyst and the reactor effluent is removed through outlet conduit 14'.

Referring now to FIG. 2, there is illustrated a different embodiment of the invention in which the reactant flow control screen is placed in the annular fluid transfer space located radially outside of the catalyst bed. Those pieces of this reactor which are identical to those shown in the embodiment of FIG. 1 or which perform an identical function although slightly different in shape or placement within the reactor are indicated by the use of the primed numeral of FIG. 1. As in FIG. 1, the sectional view of the various porous members, such as the outer catalyst retention screen 2' and the inner catalyst retention screen 3', are illustrated using a drawing symbol depicting a wire mesh screen.

This convention is employed to simplify the preparation of the drawing, especially since it is virtually impossible to prepare a representative drawing of the preferred screen material unless a greatly distorted scale is utilized.

As in the prior embodiment, the catalyst bed is gradually replaced by catalyst entering through the conduit 4' and the catalyst distribution chamber 5' which directs the catalyst through the plurality of catalyst distribution ducts 6'. Small quantities of catalyst are periodically withdrawn through the bottom of the reactor through the conduits 13' by the action of gravity and the entire catalyst bed therefore slowly moves downward through the reactor. A first or hot feed stream enters a lower portion of the reactor through the two inlet conduits 9' while a "cold" feed stream enters an upper portion of the reactor through a single inlet conduit 8'. This second feed stream descends within the reactor with part of the second feed stream passing directly through the catalyst bed through the uppermost part of the outer catalyst retention screen 2' and with a second portion of this feed stream passing through various parts of the perforated reactant flow control screen 11'. The higher temperature feed stream divides into a first portion which passes directly into the catalyst bed through the lowermost part of the catalyst retention screen 2' and a second portion which passes upward into the space between the outer catalyst retention screen and the inner surface of the reactant flow control screen 11'. This portion of the hot feed stream becomes admixed in varying degrees with the portion of the cold feed stream passing through a screen 11' with the resulting admixtures then entering the catalyst bed through the catalyst retention screen 2'. Imperforate baffles 16' are located in the lower fluid receiving volumes to lessen the backmixing of the feed stream material which is entering intermediate sections of the lower receiving volume with quantities of the resultant admixture of the two feed streams located in other sections of the receiving volume. The different portions of the feed streams pass through the annular catalyst bed and are collected in the cylindrical reactant transfer volume located within the innermost catalyst retention screen 3'. This volume, which is often referred to as the centerpipe of the reactor, is sealed at its upper end by a circular imperforate plate 17. The combined reaction products and unconverted compounds are then channeled downward and withdrawn from the reactor as the reactor effluent stream through the outlet conduit 14'.

DETAILED DESCRIPTION

Radial flow reactors find widespread utility in the petrochemical and petroleum refining industries. This is especially true in the case of moving bed radial flow reactors which are used in catalytic reforming processes to increase the octane number of very large quantities of naphtha for use in gasoline. The reforming reaction is endothermic. It is therefore customary in the predominant moving bed reforming process to heat the reactant stream by indirect heat exchange between the several passes which the reactant stream makes through different beds of catalyst. This heating is normally designed to result in the different reaction zones operating at different temperatures. However, in each of these zones or "passes" of the reactant stream through the annular catalyst bed the reactant stream has essentially the same temperature at every point at which it enters the catalyst bed.

In some instances the characteristics of a hydrocarbon conversion process which is adaptable to vapor-phase processing in a radial flow reactor will differ from that of a reforming process. The preferred configuration of the reaction system or the preferred operating conditions will therefore also differ from that of a reforming process. A particular example of this is the dehydrogenation of $C_8$ to $C_{12}$ normal paraffins to the corresponding normal olefins, a process which finds utility in the petrochemical industry as in the preparation of feedstocks for linear alkylbenzene detergent production. It is preferred in a dehydrogenation process to use a radial flow reactor since this allows the economical achievement of the desired high space velocities in a large scale commercial unit. The optimum operating temperatures for a paraffin dehydrogenation process changes significantly with the amount of time the catalyst has been used. It is therefore normal commercial operating practice to slowly adjust the operating temperature of the reactor to achieve optimum performance. The rate of this desired temperature adjustment is sufficiently high that it has been considered impractical to utilize a moving bed reactor for such a dehydrogenation process. The basic reason for this conclusion was the belief that the difference between the optimum operating temperature for the newer catalyst at the top of the catalyst bed and the optimum temperature for the more highly used catalyst at the bottom of the catalyst bed was of such a magnitude that operating at an average temperature would result in a significant degradation of overall catalyst performance. That is, with a large commercial scale moving bed reactor, it would be impossible to match the optimum operating temperature for most of the catalyst with the temperature of the feed stream. It was believed that any benefit gained by using a moving bed reactor would not make up for the decreased performance of the process due to this inability to correlate operating temperature with catalyst age.

The use of a moving bed reactor system will normally provide significant operating benefits which justify the expenditures necessary to construct the system compared to a fixed bed system. These benefits include the elimination of any need to shut down the process or swing the reactants to a different reactor to regenerate or replace the catalyst and the production of a product stream of constant quality. It is therefore an objective of the subject invention to provide a moving bed reactor which provides a temperature profile along the height of the catalyst bed. It is a specific objective of the subject invention to provide a moving bed radial flow reactor suitable for use in the dehydrogenation of normal paraffins. As used herein the term "temperature profile" is intended to refer to a temperature difference or pattern between the temperatures of the fresh catalyst at the top of the annular bed and the used catalyst at the bottom of the catalyst bed. The temperatures forming the profile can therefore be measured at one of the catalyst retaining screens or at some point a uniform distance within the catalyst bed at various heights within the apparatus. The temperature profile which is referred to herein is not the temperature profile which exists across a catalyst bed when an exothermic or endothermic reaction is performed and is therefore not measured based on the inlet and outlet temperatures of the reactants as they pass through the catalyst bed.

Radial flow reactors are a well-developed piece of processing equipment, and those skilled in the pertinent arts are very capable of designing workable reactors. The subject reactor comprises many elements common to these commercial reactors. The outer vessel, the catalyst retaining screens and the catalyst transfer means of the subject reactor may therefore be the same or similar to the equivalent elements in other reactors. The inlet and outlet conduits of the subject reactor may also be similar to present designs, with the exception that the subject reactor requires two inlet conduits.

The major elements of the subject reactor include an outer vessel. This vessel is preferably a substantially cylindrical enclosed pressure vessel which is built to the proper codes and which encloses all of the other elements of the apparatus except for those portions of the inlet and conduits and catalyst transfer means which of necessity extend through the wall to the proper auxiliary equipment. The vessel may have a horizontal or tilted major axis but is preferably vertically oriented. References to inward or outward distances are intended to indicate relative distances from this major axis.

The catalyst retaining screens of the apparatus are preferably constructed from rigid metallic screening comprising a layer of parallel rods or wires welded to perpendicular connecting rods. This provides elongated openings between the parallel rods through which the reactants may pass. By aligning the parallel rods with the direction of catalyst movement, resistance to catalyst movement and abrasion are reduced. The parallel rods preferably have a shape similar to that shown in FIG. 4 of previously referred to U.S. Pat. No. 3,706,536. Other types of catalyst retention screens such as woven wire mesh or thin perforated sheeting material may be employed if desired. It is preferred that the two catalyst retention screens are substantially cylindrical and are concentric with the major axis of the outer vessel. However, either screen may take the form of "scallops" such as shown in FIG. 4 of previously referred to U.S. Pat. No. 4,110,081. The individual screen pieces of scalloped-shaped screening is peferably used as the outer catalyst screen or catalyst retention means if employed in the reactor. The screens are normally prefabricated as smaller components which are assembled within the vessel at the erection site of the reactor. The two screens form an annular form catalyst retention volume which contains all of the catalyst present in the reactor except for the minor quantities in the catalyst transfer system.

A wide variety of catalyst transfer systems are shown in various references. Basically these systems comprise an upper distribution system and a lower collection system, both of which have means to prevent the flow of reactants from the reactor. Lock hopper systems are normally employed for this purpose. Catalyst from the upper lock hopper descends into a distribution chamber which communicates with the catalyst retention volume by a plurality of conduits extending downward in a circular pattern to the top of the catalyst volume. The catalyst collection system is normally slightly more complicated due to the presence of various caps or scoops employed to ensure a uniform collection of catalyst over the surface of the catalyst screen and a uniform catalyst turnover rate. The catalyst is collected through another plurality of small conduits and fed into a collection chamber or a lock hopper, preferably after the small conduits join into a single larger conduit. Either this single conduit or the small conduits may extend upward through the bottom surface of the vessel. The catalyst is preferably transferred to regeneration or disposal facilities but may also enter a different reaction vessel or zone in the manner of the multi-stage catalytic reforming units now employed commercially.

In a moving bed reactor the catalyst slowly moves downward by the action of gravity. The catalyst is therefore not fluidized and is present as a solid bed of particles each of which rests on particles located at lower levels. The catalyst or other particulate material present in the apparatus is preferably spherical with a diameter greater than about 1/16-inch. The catalyst may be caused to move downward by the continuous removal of a small stream of catalyst but it is preferred that small quantities of used catalyst are periodically removed and replaced with fresh or regenerated catalyst. The quantity of catalyst transferred in one of these periodic transfers is quite small and normally less than one-twentieth of the total catalyst inventory of the reactor. The rate at which catalyst is transferred through the reactor is normally such that it requires between 1 and 45 days for a complete change of the catalyst inventory of the reactor.

The subject apparatus requires three main reactant transfer conduits. Two of these conduits pass separate portions of the feed stream into the reactor on one side of the catalyst bed while the other conduit removes the effluent stream of the reactor. It is known practice to use two or more separate outlet conduits to evenly remove reactants from different points in the annular reactant transfer volume located between a cylindrical outer screen and the inner surface of the outer vessel, and this method of removing reactants may be employed in the subject apparatus. The temperature and composition of the effluent stream carried by each of these outlet conduits, which may number three or more, is the same. The composition of each of the two or more spearate streams entering the reactor is preferably the same, but the temperature of each stream is different. The temperature of each of these streams is preferably controlled, with the "coolest" stream having a temperature equal to the lowest temperature of the desired catalyst bed temperature profile, comparable to the optimum temperature for fresh catalyst. The "hottest" stream has a temperature equal to the highest temperature of the profile, comparable to the optimum temperature for used catalyst. Different temperatures are preferably obtained by passing the streams through separate firing zones in a charge heater, with the firing zones possibly having separate temperature control systems. It is also possible to vary the temperature of the two incoming streams in other ways as by the use of a small trim heater, or cooler, or by the diversion of a slipstream of the feed around the heater and its later admixture into a heated portion of the feed stream.

The subject apparatus also comprises a means to control or direct the admixture of the incoming streams and also to control or direct the passage of these streams and their admixtures into the catalyst bed. This means may be located either on the outside of the annular form catalyst bed or within the inner catalyst retention screen or centerpipe of the reactor. This means preferably comprises one or more perforated walls which extend across the volume receiving the incoming streams to substantially divide this volume into at least two separate receiving volumes. The open area of these walls is arranged to distribute the incoming feed stream from one side to pass through the wall and admix with the feed stream entering on the other side of the wall, which has a different temperature, in predetermined proportions to thereby produce admixtures having a full range of temperatures between the temperatures of the two feed streams. The temperatures achieved and their distribution within the reactor are controlled by varying the size, shape and porosity of the porous wall(s) separating the fluid receiving chambers.

One embodiment of the invention may accordingly be characterized as a moving bed radial flow fluid-solid contacting apparatus which comprises an enclosed outer vessel having a substantially vertical orientation and comprising a cylindrical outer wall; a first cylindrical particle retention screen located within the outer vessel; a second particle retention screen located within the outer vessel and concentric with the first particle retention screen, with the first and the second particle retention screens dividing a central portion of the apparatus into a substantially annular particle retention volume located between the particle retention screens and also into a first fluid transfer volume and a second fluid transfer volume which are located on opposite sides of the particle retention volume; means to transfer particles downward through the particle retention volume by gravity flow; means to control mixing of fluids located within the first fluid transfer volume and comprising a perforated wall which substantially divides the first fluid transfer volume into a first fluid receiving volume and a second fluid receiving volume, with a portion of each fluid receiving volume being defined by the surface of the same particle retention screen; a first inlet conduit communicating with the first fluid receiving volume; a second inlet conduit communicating with the second fluid receiving volume, and a first outlet conduit communicating with the second fluid transfer volume.

As shown in the drawing the means to control the flow and admixture of the feed streams may be located either within the cylindrical centerpipe volume of the reactor or in the annular fluid transfer volume located outside of the catalyst bed. Of these two embodiments the configuration of FIG. 1 is preferred. In this embodiment the porous wall has the shape of an open-topped cone which is vertically oriented about the central axis of the reactor. The porous wall of the flow control means may be made of a less expensive material than the catalyst retaining screens as it will not be subject to substantial force loadings and will not contact the catalyst. A woven wire screen may be used but a perforated sheet material is preferred. The sheet material is preferably uniformly perforated with the porosity of the wall being uniform per unit of area but increasing at the top of the wall due to the increasing diameter and exposed area of the wall. The shape of the wall also determines the size and configuration of the volumes available for the flow of the heated streams. The tapering lower fluid receiving volume of FIG. 1 will tend to restrict the flow of the higher temperature gases to the upper portion of the volume thus aiding in obtaining the desired temperature profile. The overall shape and location of the porous wall is therefore an independent factor in determining the performance of the system. However, the primary determinant of the temperature profile will be the control of the flow distribution of the colder gas across the porous wall. The pressure drop taken across the porous wall can be adjusted by changing the number of perforations in order to ensure a proper distribution. The upper circular edge of the wall preferably abuts the inner surface of the inner catalyst retaining wall at a point located below the top of the catalyst bed and the bottom of the wall is located above the bottom of the catalyst bed. It is preferred that the porous wall is located such that it is below the top 5 to 25 percent of the inner catalyst retaining screen and also above the bottom 5 to 25 percent of the inner catalyst screen. As shown in the drawing this allows the temperatures at the vertical extremities of the screen to be set by the temperatures of the two incoming streams. Mixture of the two streams is only desired in the central portion of the catalyst bed.

The invention may therefore also be characterized as a moving bed radial flow reactor which comprises an enclosed outer vessel having a substantially vertical orientation and comprising a cylindrical outer wall; a first cylindrical vertical catalyst retention screen located within the outer vessel; a second cylindrical vertical catalyst retention screen located within the outer vessel and concentric with the first catalyst retention screen, with the first and the second catalyst retention screens dividing at least a central portion of the internal volume of the apparatus into an annular catalyst retention volume location between the catalyst retention screens and also into a first fluid transfer volume and a second fluid transfer volume which are located on horizontally opposing sides of the catalyst retention volume; means to transfer catalyst downward through the catalyst retention volume by gravity flow; means to maintain a temperature profile along the height of the catalyst retention volume comprising a reactant flow and mixture control means comprising a perforated wall which substantially divides the first fluid transfer volume into a first fluid receiving volume and a second fluid receiving volume, with a portion of each fluid receiving volume being defined by the surface of the same catalyst retention screen; a first fluid inlet conduit communicating with the first fluid receiving volume; a second fluid inlet conduit communicating with the second fluid receiving volume; and a first fluid outlet conduit communicating with the second fluid transfer volume.

The turbulence which results from the high velocity entrance of the feed streams into their respective receiving volumes is expected to cause an undesirable amount of backmixing within these chambers. Although some backmixing in unavoidable, a large amount of backmixing is undesirable since it tends to eliminate or at least reduce the desired even change in the temperature profile. It is therefore preferred that means are employed within the receiving volumes to lessen backmixing. These means are preferably substantially imperforate baffles or plates extending into the receiving volume from the surface of the particle retention screen. Several of these baffles may be employed to divide the surface of the screen through which the reactants enter the catalyst bed into a number of zones receiving different reactant admixtures. The baffles or other means preferably point or curve toward either the upper or lower end of the volume at which the feed stream enters the receiving volume to thereby direct streams of the moving feed stream toward the screen and also to segregate them from other streams. It is preferred that these baffles extend a distance away from the screen through which the feed stream enters the catalyst bed equal to at least one-quarter, and more preferably one-third, of the distance across the available open width of the respective fluid receiving volume. These baffles may also be employed when the fluid receiving volumes are located in the annular fluid transfer volume of the reactor.

The apparatus is subject to extensive variation. For instance, the perforate wall used to divide the fluid transfer volume into the two fluid receiving volumes may function effectively without abutting a catalyst retention screen. The use of two or more perforate walls is another possible variation. Any imperforate means employed to retard backmixing within the fluid receiving chamber may be fastened to the perforate wall of the reactant flow and mixture control means. Another variation would be the use of perforate walls or screens to subdivide the fluid receiving volumes into smaller volumes through which the feed stream would pass in series. Another variation in the subject apparatus, which is definitely not preferred, is the provision of a third inlet conduit for the passage of a third feed stream of intermediate temperature into a fluid receiving volume and the corresponding modification of the reactor internals such as the perforate wall(s) used to divide the fluid receiving transfer volume.

The manner in which the subject apparatus may be used is also subject to considerable variation. As previously mentioned it can be employed as a nonreactive vapor-solid contacting apparatus such as an adsorption vessel. It is preferred that the apparatus is used as a reactor and that two feed streams of different temperature but identical composition are passed into the reactor. In another contemplated embodiment of using the apparatus as a reactor, a portion or all of a recycle stream or a hydrogen-rich stream is admixed with one of the feed streams to thereby produce feed streams having both different compositions and different temperatures. The rate of admixture of these materials into one or both of the feed streams may be used to produce the required temperature differential. The previously referred to use of different firing zones in the same heater is the preferred method of providing the temperature differential since this method should result in the two streams having substantially the same pressure. A pressure differential exceeding about 2 psig between the feed streams is not desired since it may detrimentally effect the desired temperature profile. It is preferred that the temperature difference between the feed streams is at least 5 Centigrade degrees and more preferably is greater than 20 Centigrade degrees.

A wide variety of hydrocarbon conversion processes can be performed using the subject invention. These processes include the reforming of naphtha fractions, the isomerization of normal paraffins, the isomerization or transalkylation of alkylaromatic hydrocarbons and the general light hydroprocessing of petroleum fractions performed to eliminate olefins, diolefins, sulfur or nitrogen. It is preferred that a process for the dehydrogenation of a $C_2$ to $C_{20}$ paraffinic hydrocarbon is performed in the apparatus. It is especially preferred that the paraffinic hydrocarbon contains from 7 to 16 carbon atoms per molecule.

A broad range of processing conditions includes a temperature from about 500° F. to about 1300° F., a pressure of from atmospheric to about 1000 psig and a liquid hourly space velocity of between 1 and 60. The liquid hourly space velocity is defined to be the ratio of the liquid-phase volume at 60° F. of the quantity of the reactants passed through the catalyst bed in one hour to the volume of the catalyst contained within the catalyst bed. A preferred set of processing conditions includes a liquid hourly space velocity between 7 and 35, a temperature of about 750° to 1050° F., and a pressure between 5 and 200 psig. The preferred catalyst comprises a catalytically effective amount of a Group VIII metal component on a refractory inorganic support. The Group VIII metal is preferably a platinum group metal, with platinum being especially preferred. The Group VIII metal component(s) preferably equal from about 0.1 to 1.8 wt.% of the finished catalyst. The refractory support is preferably alumina, but may be a natural or synthetic zeolitic material. When used for dehydrogenation the catalyst preferably also contains relatively equal amounts of a halogen and an alkaline earth or an alkali metal, such as chlorine and potassium, at a weight concentration above 0.5 wt.% and also contains a tin component equal to about 0.1 to about 1.0 wt.% of the catalyst.

The two feed streams are passed into the reactor and distributed by the perforate wall and any other means employed within the reactor to maintain the desired temperature profile. The reactants pass through the catalyst bed and the desired reaction is effected by the contacting of the reactants and catalyst at the proper reaction conditions. The effluent of the catalyst bed is then removed as the reactor effluent stream and passed to product recovery facilities. The reactor effluent stream is preferably first cooled to effect a partial condensation and the separation of recycle or produce hydrogen in a vapor-liquid separation zone. A portion of this hydrogen is preferably recycled to maintain a hydrogen to total hydrocarbon mole ratio above at least 1:1. The liquid-phase hydrocarbon stream may then be passed into a fractional distillation zone wherein in the product is recovered, thereby allowing the unconverted reactants to be recycled. In the case of long chain paraffin dehydrogenation for linear alkylbenzene production, the liquid-phase hydrocarbon stream is preferably passed directly into an acid-catalyzed alkylation zone wherein the olefinic hydrocarbons react with an aromatic hydrocarbon.

I claim as my invention:

1. A moving bed radial reactor which comprises:
   (a) an enclosed outer vessel comprising a cylindrical outer wall;
   (b) an annular form catalyst bed confined within a catalyst retaining system comprising an inner catalyst retention screen and an outer catalyst retention means;
   (c) a first fluid outlet means communicating with a first fluid transfer volume located between the outer catalyst retention means and the outer wall of the vessel;
   (d) means to maintain a temperature profile along the height of the catalyst bed comprising:
      (i) a perforated wall which substantially divides a cylindrical second fluid transfer volume located within the inner catalyst retention screen into a first fluid receiving volume and a second fluid receiving volume, and provides, at one end thereof, for contact of the catalyst with a first fluid only and, at the other end thereof, provides for contact of the catalyst with a second fluid only and between said ends provides for contact of the catalyst with a controlled mixture of said first fluid and said second fluid;
      (ii) a first fluid inlet conduit for entry of said first fluid to said reactor having a set temperature communicating with the first fluid receiving volume;
      (iii) a second fluid inlet conduit for entry of said second fluid to said reactor having a set temperature different from the temperature of said first fluid communicating with the second fluid receiving volume; and,
   (e) means to transfer catalyst downward by gravity flow through the catalyst retaining system.

2. The reactor of claim 1 further characterized in that the outer catalyst retention means is cylindrical.

3. The reactor of claim 1 further characterized in that the reactor comprises means to lessen fluid backmixing comprising baffles located in said second fluid receiving volume and extending from the surface of the inner catalyst retention screen.

4. A moving bed radial flow fluid-solid contacting apparatus which comprises:
   (a) an enclosed outer vessel having a substantially vertical orientation and comprising a cylindrical outer wall;
   (b) a first cylindrical particle retention screen located within the outer vessel;
   (c) a second particle retention screen located within the outer vessel and concentric with the first particle retention screen, with the first and the second particle retention screens dividing a central portion of the apparatus into a substantially annular particle retention volume located between the particle retention screens and also into a first fluid transfer volume and a second fluid transfer volume which are located on opposite sides of the particle retention volume;
   (d) means to transfer particles downward through the particle retention volume by gravity flow;
   (e) a first inlet conduit for entry of a first fluid to said apparatus having a set temperature communicating with the first fluid receiving volume;
   (f) a second inlet conduit for entry of a second fluid to said apparatus having a set temperature different from the temperature of said first fluid communicating with the second fluid receiving volume; and,
   (g) means to control mixing of said first and second fluids located within the first fluid transfer volume, wherein said means comprises a perforated wall which substantially divides the first transfer volume into a first fluid receiving volume and a second fluid receiving volume, with portions of the surface of one of said particle retention screens defining a portion of each of said fluid receiving volume, said control means also providing, at one end thereof, for contact of the catalyst with said first fluid only and, at the other end thereof, provides for contact of the catalyst with said second fluid only and between said ends provides for contact of the catalyst with a controlled mixture of said first fluid and said second fluid; and,
   (h) a first outlet conduit communicating with the second fluid transfer volume.

5. The apparatus of claim 4 further characterized in that the first fluid transfer volume is annular in shape and is located between the outermost particle retention screen and the outer wall of the outer vessel.

6. The apparatus of claim 4 further characterized in that the second particle retention screen is cylindrical.

7. The apparatus of claim 4 further characterized in that the first fluid transfer volume is cylindrical in shape and is located within the innermost particle retention screen.

8. The apparatus of claim 7 further characterized in that the perforated wall of the means to control fluid mixing comprises a cone-shaped wall.

9. The apparatus of claim 8 further characterized in that the first fluid inlet conduit communicates with the first fluid receiving volume, which is partially located within the perforated wall of the means to control fluid mixing, through the smaller end of the cone-shaped wall.

10. A moving bed radial flow reactor which comprises:
    (a) an enclosed outer vessel having a substantially vertical orientation and comprising a cylindrical outer wall;
    (b) a first cylindrical vertical catalyst retention screen located within the outer vessel;

(c) a second cylindrical vertical catalyst retention screen located within the outer vessel and concentric with the first catalyst retention screen, with the first and the second catalyst retention screens dividing at least a central portion of the internal volume of the apparatus into an annular catalyst retention volume located between the catalyst retention screens and also into a first fluid transfer volume and a second fluid transfer volume which are located on horizontally opposing sides of the catalyst retention volume;

(d) means to maintain a temperature profile along the height of the catalyst retention volume comprising:

(i) a reactant flow and mixture control means comprising a perforated wall which substantailly divides the first fluid transfer volume into a first fluid receiving volume and a second fluid receiving volume, portions of the surface of one of the said particles retention screens defining a portion of each of said fluid receiving volume, and provides, at one end thereof, for contact of the catalyst with a first fluid only and, at the other end thereof, provides for contact of the catalyst with a second fluid only and between said ends provides for contact of the catalyst with a controlled mixture of said first fluid and said second fluid;

(ii) a first fluid inlet conduit for entry of said first fluid to said reactor having a set temperature communicating with the first fluid receiving volume;

(iii) a second fluid inlet conduit for entry of said second fluid to said reactor having a set temperature different from the temperature of said first fluid communicating with the second fluid receiving volume; and, (e) means to transfer catalyst downward through the catalyst retention volume by gravity flow;

(f) a first fluid outlet conduit communicating with the second fluid transfer volume.

11. The reactor of claim 10 further characterized in that the first fluid transfer volume is cylindrical in shape and is located within the innermost catalyst retention screen.

12. The reactor of claim 11 further characterized in that the perforated wall of the reactant flow and mixture control means is substantially in the shape of an inverted truncated cone and divides the first fluid transfer volume into the upper first fluid receiving volume and the lower second fluid receiving volume.

13. The reactor of claim 12 further characterized in that downward slanted baffles are located in the lower second fluid receiving volume and extend radially inward from the innermost catalyst retention screen.

* * * * *